US005931517A

United States Patent [19]
Welch

[11] Patent Number: 5,931,517
[45] Date of Patent: Aug. 3, 1999

[54] WCW TRENCH CLEANER

[75] Inventor: William C. Welch, P.O. Box 8128, Topeka, Kans. 66608-0128

[73] Assignee: William C. Welch, Topeka, Kans.

[21] Appl. No.: 09/175,749

[22] Filed: Oct. 20, 1998

[51] Int. Cl.[6] ................................ A01B 1/00; B07B 1/02
[52] U.S. Cl. .......................... 294/50.8; 294/118; 209/418
[58] Field of Search ............................... 294/1.3, 1.4, 11, 294/50.8, 55, 66.1, 118; 209/417–419

[56] References Cited

U.S. PATENT DOCUMENTS

| | | | |
|---|---|---|---|
| 407,465 | 7/1889 | Brick | 294/50.8 |
| 1,138,371 | 5/1915 | Flynn | 294/50.8 |
| 1,862,539 | 6/1932 | Johnson | 294/66.1 |
| 1,903,277 | 4/1933 | Barnes | 294/55 |
| 2,603,526 | 7/1952 | Tennis | 294/118 |
| 3,106,419 | 10/1963 | Estwing | 294/55 |
| 3,617,084 | 11/1971 | Mares | 294/1.4 |
| 3,851,763 | 12/1974 | Ball et al. . | |
| 3,879,079 | 4/1975 | Nicholas | 294/1.4 |
| 3,976,564 | 8/1976 | Holder . | |

*Primary Examiner*—Dean Kramer

[57] ABSTRACT

A new tool for cleaning out unwanted debris from the bottom of trenches of the type having at the top portion of its two handles (2) rubber sheathing (1) for better gripping. The handles (2) of the tool extend the entire length of the tool. At the bottom of the handles (2) are attached two scooper trays (4). The handles (2) are attached to each other by way of a fulcrum provided by a bolt (3) that passes through each handle (2) and secured by a nut and washers (3). The tool functions by way of an operator pulling outward on the rubber sheathed (1) portion of the handles (2) to cause an opening action at the bottom of the tool whereas the trays (4) move outward from each other. Once the trays (4) are positioned around the debris to be removed, the operator moves the rubber sheathed (1) portion of the handles (2) back toward each other causing the same action on the opposite end with the result being the trays (4) moving inward toward each other and slicing under the debris to be removed. The debris is now resting on the trays (4) and is ready for removal. As the tool is lifted from the trench, acceptable (regulator) debris falls through the apertures (6) in the trays (4) and remains in the trench. Unwanted (non-regulatory) debris is then lifted out and removed from the trench.

1 Claim, 1 Drawing Sheet

WCW TRENCH CLEANER

BACKGROUND

1. Field of Invention

Figure 3:
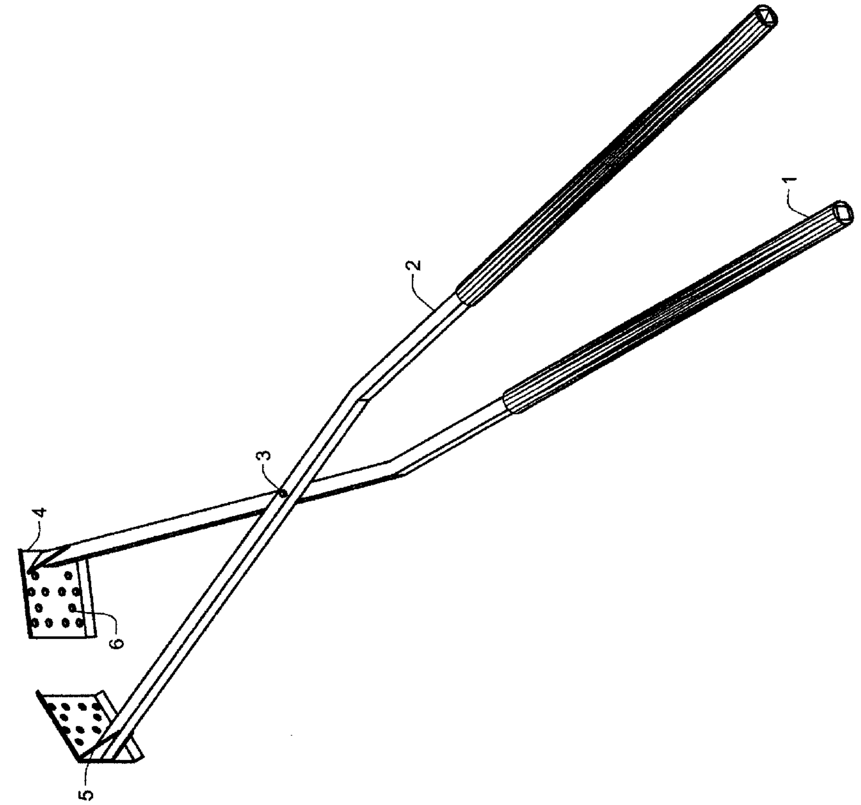

This invention relates to scooping mechanisms, specifically to such scooping mechanisms which are used for removing non-regulation size debris from the bottom of trenches.

2. Description of Prior Art

In the utility construction business it has always been a problem to extract rocks and other debris left behind by trenching machines. Rocks and other debris over a specific size will cause damage to such utility lines as water, sewer, gas, fiber optics, telephone and coaxial if left in the trench.

In the past, the primary method for removal of such debris has been achieved by ordering laborers to bodily enter narrow, vertical trenches and manually lift out these debris. This practice is a violation of Occupational Safety and Health (OSHA) regulations and has accounted for the untimely demise of many construction workers.

Another method used to extract non-regulation size debris is achieved by bending the steel digging end of a regular spade to a ninety degree angle. This creates a planar surface for debris to rest on. The described method consists of modifying a regular spade and is not a tool manufactured for this use.

Problems with the 'bent spade' method are several. First, the length of the device is the same as that of your common spade, about three and one half to four feet. This requires laborers to get down on their hands, knees and bellies to reach most depths. Often time the spade simply is not long enough at all. Back injuries are the result of such contorted bodily positions. Secondly, the back of strength in the planar surface is problematic. With much weight the spade easily bends or breaks. Finally, in order for a laborer to keep the debris on the spade he/she must move the spade in an arc so that debris will rest against the vertical portion of the spade. This requires sufficient strength, awkward positioning and great balance; because of this, debris often fall from the spade during the removal lift. There is also the problem of protruding roots from the walls of the trench which creates difficulties for the bent spade. Because of the bent spade's lack of effectiveness, manual entry has prevailed.

My patent search has revealed that there has never been a manufactured tool for this application.

My patent search did turn up two tools with sifting mechanisms built in. One, a described dual purpose garden tool, U.S. Pat. No. 3,851,763 to Ball et al. (Mar. 27, 1972), comprising a combination spade and screen or sifter device. The other tool, U.S. Pat. No. 3,976,564 to Holder (Aug. 24, 1976), a described combination digger and sifter for use with metal detector. A device for use in conjunction with a metal detector which will allow the user to dig and sift simultaneously with one hand.

Thus it is plain to see that the WCW TRENCH CLEANER! is a completely different, non-competing tool which lacks infringement potential.

OBJECTS AND ADVANTAGES

Several objects and advantages of the WCW TRENCH CLEANER! are:

(a) to provide a safe way of removing non-regulation size debris from the bottom of trenches;

(b) to provide a light weight, debris removal tool, allowing an upright working position that greatly lessens the chance of back injuries;

(c) to provide an efficient method of debris removal that prevents debris from falling off tool before it has exited the trench;

(d) to provide a tool that can be modified to reach most trench depths;

(e) to provide a tool with a comfortable, cushioned grip to reduce hand fatigue;

(f) to provide an extremely durable tool which will sustain years of hard construction use;

(g) to provide a tool which will lift large rocks numerous times without bending, or breaking; and (h) to provide a tool which will be highly visible amidst tall grass and weeds.

Still further objects and advantages will become apparent from a consideration of the ensuing description and drawings.

DRAWING FIGURES

Figure 2:
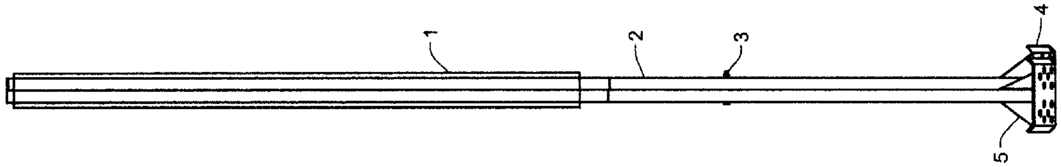
Figure 1:
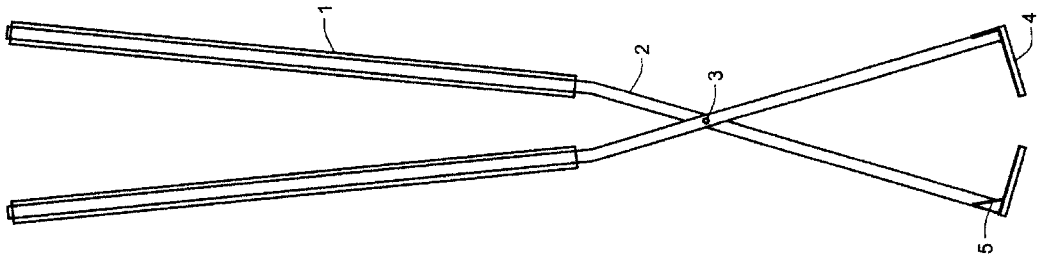

In the drawings, the numbers in each figure reference the same portion of the tool (e.g. FIG. 1 numbers are the same respectively as in FIG. 2 and FIG. 3 with the exception of number 6 in FIG. 3 which is a part that is not easily seen in the previous two figures.)

FIG. 1 will be considered the front view of the tool in an upright position.

FIG. 2 will be considered the side view of the tool in an upright position.

FIG. 3 will be considered the top view of the tool laying on its side.

REFERENCE NUMERALS IN DRAWINGS

1 rubber sheaths
2 handles
3 steel bolt, nut and washers
4 trays
5 gussets
6 apertures

SUMMARY

In accordance with the present invention a trench cleaner comprises an elongated tubular handle, a rubber sheath over the top portion of the handle, a fulcrum point comprising a bolt, nut and washers, two trays with a plurality of apertures in each try and structural gussets supporting each tray.

DESCRIPTION—FIGS. 1,2,3

A typical embodiment of the present invention is illustrated in FIG. 1 (front view upright) and FIG. 3 (view from the top laying on its side). Both sides of the tool are mirror images of each other and hence contain the same parts respectively. The top portion of the handles 2 of the tool are covered by rubber sheaths 1. These rubber sheaths are designed to withstand long term construction grade abuse.

In FIG. 1 the handles 2 extend continuously from the top of the tool to the bottom of the tool with a slight offset which occurs at approximately one half the length of the tool.

In FIG. 1 the two handles 2 have a fulcrum point comprised of a steel bolt, nut and washers 3 on which the tool pivots to open and close.

In FIG. 3 the trays 4 are designed to provide a planar surface for which various unwanted trench debris will rest for removal from the trench. The trays 4 are sharpened to aid in easily cutting through dirt and are slightly angled upward on the sides to help keep debris from rolling off the trays 4.

In FIG. 3 the gussets 5 are triangular in shape, attach the handles 2 to the trays 4 and act as strength to support the trays 4.

In FIG. 3 the randomly distributed apertures 6 are drilled into the trays 4 to allow for acceptable size debris to pass through the remain in the trench. Unacceptable debris is larger in diameter than the apertures 6 and will hence stay on the trays 4 for removal.

FIG. 3 (side view upright) shows the same parts with respect to numerals as those seen in FIG. 1 and FIG. 3 except for the apertures 6 which are only labeled in FIG. 3 because the angle in which FIG. 3 lays permits a better view of the apertures 6.

OPERATON—FIGS. 1,2,3

The following description of operation of the trench cleaning tool will be explained through FIG. 3 only since it embodies and depicts all the same parts respectively as FIG. 1 and FIG. 2 with the additional depiction of the apertures 6 which aren't easily seen or labeled in FIG. 1 and FIG. 2. Namely, a person (operator) first picks up the trench cleaning tool by the portion of the handles 2 which are covered by the rubber sheaths 1. Next, holding the tool so that the plane of the trays 4 are generally parallel and near to the ground and the rubber sheathed 1 portion of the handles 2 are pointed upward, the operator inserts the tool, trays 4 first into a trench in an effort to remove unwanted debris from the bottom of the trench Then, hand over hand, the operator lowers the tool into the trench by working his/her hands up the rubber sheathed 1 portion of the handles 2. Once the trays 4 have contacted the bottom of the trench, the operator then, holding the rubber sheathed 1 portion of the handles 2, pulls the opposing handles 2 away from each other, or outward. This outward motion of the top portion of the handles 2 has the same effect at the bottom of the handles 2 causing the trays 4 to move away from each other. The operator then positions the trays 4 on each side of the unwanted debris at the bottom of the trench. By moving the rubber sheathed 1 portion of the handles 2 back toward each other the operator creates the same effect at the bottom of the handles 2 causing the trays 4 to move toward each other. From this motion the trays 4, with their sharp forward edges, cut through dirt and slide under the unwanted debris. This results in the unwanted debris resting upon the trays 4. Next, the operator begins the ascent of the tool from the trench, pulling the tool upward by working his/her hands down the length of the rubber sheathed 1 portion of the tool handle 2. Upon the ascent, acceptable debris (debris which is smaller in diameter than the apertures 6 in the trays 4) fall through the apertures 6 in the trays 4 to the bottom of the trench. Once the operator has lifted the entire tool from the trench, the operator again, holding the rubber sheathed 1 portion of the handles 2, pulls the opposing handles 2 away from each other, or outward. The outward motion of the top portion of the handles 2 has the same effect at the bottom of the handles 2 causing the trays 4 to move away from each other. This in turn allows any unwanted debris to fall of the trays 4 to an acceptable area outside the trench.

CONCLUSIONS, RAMIFICATIONS, AND SCOPE

Accordingly, the reader will see that the trench cleaning tool I have invented allows the once deathly hazardous, and inefficient duty of removing unwanted debris from the bottom of trenches, to be done safely and efficiently. In addition, the trench cleaning tool has a much longer life than the common spade which was modified in the past to attempt to accomplish the same means, but with failed results. The trench cleaning tool's light weight and handle design extremely reduce the chance for employee back injuries over prior methods. The modifiable lengths of the trench cleaning tool also aid in reduced back injuries since this permits the operator of the tool to reach greater depths without the need for stooping over, or laying on the ground. The rubber sheathed handles allow for a better grip, greater comfort, less blisters and zero splinters as opposed to wooden handles, modified spades. Since the tool will be painted with bright colors like yellow and blue, it will stand out well in fields of green grass and weeds if left laying. The old modified spade was forever being lost once laid down in tall weeds and grass because its brown, wooden handle blended in well with the dirt and weeds. The materials and design of the trench cleaning tool also permit it to lift considerably larger debris than did previous methods. Furthermore, the trench cleaning tool's greatest attribute is its ability to allow workers to remove unwanted trench debris without entering a trench and exposing themselves to unsafe conditions which continue to kill many construction workers each year.

Although the description above contains many specificities, these should not be construed as limiting the scope of the invention, but as merely providing illustrations of some of the presently preferred embodiments of this invention. For example, the handles can have different lengths to reach varying depths of trenches; the trays can be made wider, or longer depending on the application; the materials that make up the handles and trays of the invention can vary between aluminum, plastic, etc.; the shape of the handles can take the form of cylindrical tubing as well as square tubing etc.

Thus the scope of the invention should be determined by the appended claims and their legal equivalents, rather than by the examples given.

I claim:

1. A manually operated trench cleaning device for safely extracting non-regulatory size debris from the bottom of narrow trenches while allowing regulatory size medium to remain, comprising:

a. two scooper trays provided with a plurality of generally circular apertures through which said portion of regulatory medium may pass while containing said non-regulatory debris for removal, and b. two elongated handles to which the bottom of each said handle one said scooper tray is attached, and c. said handles are attached to each other by way of a fulcrum provided by a bolt that passes through each said handle and secured by a nut and washers, whereby as said handles are moved toward each other, said handles pivot on said fulcrum causing said scooper trays to also move toward each other until said scooper trays meet providing a planar surface for holding said non-regulatory debris for removal from said trenches.

* * * * *